(12) United States Patent
Lindo et al.

(10) Patent No.: US 9,107,495 B2
(45) Date of Patent: Aug. 18, 2015

(54) ADJUSTABLE POLE CADDY

(71) Applicant: Zenith Products Corporation, New Castle, DE (US)

(72) Inventors: Benjamin G. Lindo, Philadelphia, PA (US); Joseph Vaccaro, West Chester, PA (US); Kaveh Didehvar, Hockessin, DE (US)

(73) Assignee: Zenith Products Corporation, New Castle, DE (US)

( * ) Notice: Subject to any disclaimer, the term of this patent is extended or adjusted under 35 U.S.C. 154(b) by 0 days.

(21) Appl. No.: 14/120,764

(22) Filed: Jan. 24, 2014

(65) Prior Publication Data

US 2014/0311999 A1 Oct. 23, 2014

Related U.S. Application Data

(62) Division of application No. 13/480,149, filed on May 24, 2012.

(51) Int. Cl.
*A47B 57/26* (2006.01)
*A47B 57/56* (2006.01)
(Continued)

(52) U.S. Cl.
CPC ............... *A47B 57/265* (2013.01); *A47B 57/26* (2013.01); *A47B 57/565* (2013.01); *A47K 3/281* (2013.01); *A47K 17/00* (2013.01); *A47B 57/06* (2013.01); *F16B 2/065* (2013.01)

(58) Field of Classification Search
CPC ...... A47B 57/18; A47B 57/565; A47B 57/54; A47B 57/44; A47B 57/46; A47B 57/30; A47B 57/26; A47B 57/06; A47K 3/281
USPC ........ 211/75, 85, 90.03, 103, 119.009, 126.5, 211/133.5, 133.4, 187, 153, 190, 193, 196, 211/205, 208; 248/125.1, 125.2, 218.4, 248/235, 241, 243, 244, 245, 250
See application file for complete search history.

(56) References Cited

U.S. PATENT DOCUMENTS 626,739 A 6/1899 Vanderman
750,063 A 1/1904 Redding
(Continued)

FOREIGN PATENT DOCUMENTS

FR 2538052 A1 * 6/1984

OTHER PUBLICATIONS

Office Action issued Jan. 17, 2014 in U.S. Appl. No. 13/480,149 by Lindo.
U.S. Appl. No. 29/486,261 by Walker, filed Mar. 27, 2014.
Office Action issued Sep. 18, 2014 in U.S. Appl. No. 13/480,149 by Lindo.
Office Action issued Jun. 12, 2014 in U.S. Appl. No. 13/480,149 by Lindo.
(Continued)

*Primary Examiner* — Stanton L Krycinski
(74) *Attorney, Agent, or Firm* — Panitch Schwarze Belisario & Nadel LLP

(57) ABSTRACT

An adjustable pole caddy includes an elongated pole, a shelf including a generally planar surface for supporting at least one object thereon, a clamp having a first aperture and a second aperture, and a fastener extending through the first aperture of the clamp. The second aperture extends around at least a portion of an outer periphery of the pole. In a locked position of the fastener and clamp, an end portion of the fastener engages the pole and at least a portion of the shelf removably engages at least a portion of the clamp. The clamp is secured to the pole and the shelf is secured to the clamp. In a released position of the fastener and clamp, the end portion of the fastener does not engage the pole.

2 Claims, 4 Drawing Sheets

(51) Int. Cl.
  *A47K 3/28* (2006.01)
  *A47K 17/00* (2006.01)
  *A47B 57/06* (2006.01)
  *F16B 2/06* (2006.01)

(56) References Cited

U.S. PATENT DOCUMENTS

| | | | |
|---|---|---|---|
| 824,026 | A | 6/1906 | Jones |
| 1,409,609 | A | 3/1922 | Stockle |
| 1,625,935 | A | 4/1927 | Cox |
| 2,689,072 | A | 9/1954 | Dechar |
| 2,894,642 | A | 7/1959 | Clevett, Jr. |
| 3,065,860 | A | 11/1962 | Swanson |
| 3,280,767 | A | 10/1966 | Kahn |
| 3,344,756 | A | 10/1967 | Kelson |
| 3,479,990 | A | 11/1969 | Crow |
| 3,572,787 | A | 3/1971 | Timmerman et al. |
| 3,584,821 | A | 6/1971 | Glebe |
| 3,874,511 | A | 4/1975 | Maslow |
| 3,938,872 | A | 2/1976 | Hagerman |
| 3,964,404 | A | 6/1976 | Mueller et al. |
| 4,096,951 | A | 6/1978 | Menssen |
| 4,120,250 | A | 10/1978 | Viessmann |
| 4,242,969 | A | 1/1981 | Checkwood et al. |
| 4,257,333 | A | 3/1981 | Pollack |
| D274,201 | S | 6/1984 | Aaron |
| 4,494,661 | A | 1/1985 | Krusche |
| 4,528,914 | A | 7/1985 | Montet |
| 4,671,415 | A | 6/1987 | Manhart |
| D292,764 | S | 11/1987 | Kester |
| 4,811,996 | A | 3/1989 | Hansson |
| 4,860,909 | A | 8/1989 | Leumi |
| D320,134 | S | 9/1991 | Emery |
| D323,439 | S | 1/1992 | Emery |
| 5,114,023 | A | 5/1992 | Lavin |
| D341,463 | S | 11/1993 | Booth |
| 5,294,008 | A | 3/1994 | Dunaway |
| D351,751 | S | 10/1994 | Brightbill et al. |
| 5,390,800 | A | 2/1995 | Tucker |
| D364,767 | S | 12/1995 | McLinden |
| D372,154 | S | 7/1996 | Chapman |
| D376,231 | S | 12/1996 | McLain |
| 5,601,198 | A | 2/1997 | Reed |
| D379,412 | S | 5/1997 | Hampshire |
| 5,634,619 | A | 6/1997 | Alessi |
| D382,751 | S | 8/1997 | Andrus |
| D387,595 | S | 12/1997 | Whang |
| D388,642 | S | 1/1998 | Winter |
| D389,999 | S | 2/1998 | Daigle et al. |
| 5,746,334 | A * | 5/1998 | Brandenberg ............ 211/205 |
| D394,968 | S | 6/1998 | Gottwald |
| D395,362 | S | 6/1998 | Fink et al. |
| D395,773 | S | 7/1998 | Hofman |
| 5,791,501 | A | 8/1998 | Baldwin, Jr. |
| D397,570 | S | 9/1998 | Hoernig |
| D401,092 | S | 11/1998 | Patel |
| 5,931,315 | A | 8/1999 | Lorentz et al. |
| D417,107 | S | 11/1999 | Patel et al. |
| D417,991 | S | 12/1999 | Hofman et al. |
| 5,996,511 | A | 12/1999 | Swoger |
| D419,020 | S | 1/2000 | Emery et al. |
| D421,692 | S | 3/2000 | Wojtowicz et al. |
| D421,867 | S | 3/2000 | Carville et al. |
| D429,934 | S | 8/2000 | Hofman |
| D431,109 | S | 9/2000 | Lacy et al. |
| D436,487 | S | 1/2001 | Walker |
| D443,162 | S | 6/2001 | Winter |
| 6,318,572 | B1 | 11/2001 | Lai |
| D458,491 | S | 6/2002 | Ho |
| D460,651 | S * | 7/2002 | Jobe et al. ............ D6/539 |
| D462,552 | S | 9/2002 | Emery et al. |
| D463,123 | S | 9/2002 | Hradisky |
| 6,477,966 | B1 | 11/2002 | Petryna |
| 6,494,327 | B2 | 12/2002 | Huang |
| D469,610 | S | 2/2003 | Corp et al. |
| D470,978 | S | 2/2003 | Hoernig |
| 6,520,351 | B1 | 2/2003 | Zadro |
| 6,554,235 | B1 | 4/2003 | Fortier |
| D474,603 | S | 5/2003 | Berenguer |
| D475,560 | S | 6/2003 | Suero, Jr. |
| D475,561 | S | 6/2003 | Suero, Jr. |
| D476,509 | S | 7/2003 | Orsino et al. |
| D485,092 | S | 1/2004 | Rosen |
| 6,688,238 | B1 | 2/2004 | Alexiou |
| 6,726,038 | B2 | 4/2004 | Ko |
| D499,286 | S | 12/2004 | Harwanko |
| 6,837,386 | B1 | 1/2005 | Kent et al. |
| D508,322 | S | 8/2005 | Horst |
| D509,361 | S | 9/2005 | Suero, Jr. |
| D517,806 | S | 3/2006 | Charuwongkhachton |
| 7,060,040 | B2 | 6/2006 | Farmer |
| D537,665 | S | 3/2007 | Hart |
| 7,186,050 | B2 | 3/2007 | Dean et al. |
| D542,058 | S | 5/2007 | Clucas |
| D542,536 | S | 5/2007 | Gialanella |
| D543,747 | S | 6/2007 | Harwanko |
| D553,361 | S | 10/2007 | Splain et al. |
| D554,416 | S | 11/2007 | Thompson et al. |
| D556,476 | S | 12/2007 | Butler et al. |
| D559,023 | S | 1/2008 | Reichert |
| D564,271 | S | 3/2008 | Snider |
| D566,991 | S | 4/2008 | Harwanko |
| D569,148 | S | 5/2008 | Yang et al. |
| D572,502 | S | 7/2008 | Yang et al. |
| D572,516 | S | 7/2008 | Snider |
| D572,940 | S | 7/2008 | Murray |
| D573,386 | S | 7/2008 | Clucas |
| D573,387 | S | 7/2008 | Walker |
| D574,649 | S | 8/2008 | Snider |
| D580,194 | S | 11/2008 | Lambert et al. |
| 7,459,636 | B2 | 12/2008 | Conrad |
| 7,478,971 | B2 | 1/2009 | Li |
| D588,814 | S | 3/2009 | Ghiorghie |
| D588,840 | S | 3/2009 | Dretzka |
| 7,527,600 | B2 | 5/2009 | Farmer |
| D603,198 | S | 11/2009 | Guindi |
| D614,888 | S | 5/2010 | Sexton |
| D616,202 | S | 5/2010 | Whitlock et al. |
| D616,235 | S | 5/2010 | Guindi |
| D616,680 | S | 6/2010 | Snider |
| D617,126 | S | 6/2010 | Snider |
| D620,293 | S | 7/2010 | Guindi |
| D624,754 | S | 10/2010 | van Wijk et al. |
| D628,385 | S | 12/2010 | Klein et al. |
| D635,769 | S | 4/2011 | Sosnovsky |
| D636,606 | S | 4/2011 | Wang |
| D637,000 | S | 5/2011 | Goodman et al. |
| D650,209 | S | 12/2011 | Snider |
| 2004/0226903 | A1 | 11/2004 | Wang |
| 2005/0276048 | A1 | 12/2005 | Farmer |
| 2006/0193141 | A1 | 8/2006 | Farmer |
| 2006/0261022 | A1 | 11/2006 | Sampaio |
| 2007/0284326 | A1 | 12/2007 | Baloun |
| 2008/0035592 | A1 | 2/2008 | Yang et al. |
| 2008/0053935 | A1 | 3/2008 | Newbouild et al. |
| 2008/0156759 | A1 | 7/2008 | Lai |
| 2008/0185357 | A1 | 8/2008 | Chen |
| 2008/0203042 | A1 | 8/2008 | Felsenthal |
| 2009/0189035 | A1 | 7/2009 | Gambill |
| 2013/0313212 | A1 | 11/2013 | Lindo et al. |

OTHER PUBLICATIONS

Photographic image of a pole caddy, 1 page (admitted prior art as of at least May 23, 2011).
Second photographic image of a pole caddy, 1 page (admitted prior art as of at least May 23, 2011).
Third photographic image of a pole caddy, 1 page (admitted prior art as of at least May 23, 2011).
Fourth photographic image of a pole caddy, 1 page (admitted prior art as of at least May 23, 2011).

* cited by examiner

ADJUSTABLE POLE CADDY

CROSS REFERENCE TO RELATED APPLICATIONS

This application is a Divisional of U.S. patent application Ser. No. 13/480,149, filed May 24, 2012, the disclosure of which is incorporated herein.

BACKGROUND OF THE INVENTION

The present invention relates generally to an apparatus for supporting at least one object from or above a ground surface and, more particularly, to an apparatus equipped with an adjustable shelving system designed to hold, carry and/or support various objects in an organized manner.

The apparatus may be used as a shower or bath caddy because it is desirable to have an apparatus capable of supporting a variety of bathing articles (e.g., soap, shampoo, conditioner, etc.) that individuals generally require when bathing or taking a shower. Numerous types of shower caddies have been developed to support such articles so that an individual taking a shower can readily access such articles. One type of such conventional shower caddies includes caddies which are mounted over a shower head assembly. Another type of known shower caddies includes pole caddies which are mounted between two opposing surfaces of a shower stall or bath enclosure.

A problem with conventional pole shower caddies is that the individual shelves of the caddies have fixed positions, and thus the shelves cannot be adjusted to accommodate bathing articles of different sizes. Other conventional pole shower caddies may include adjustable shelves, but the configuration of these caddies requires the pole to be disassembled or removed from its mounted position in order to remove or move an individual shelf.

Thus, it is desirable to provide an improved pole shower caddy configured to allow the positions of individual shelves to be easily adjusted. More particularly, it is desirable to provide a shower caddy which is configured to allow individual shelves to be removed or moved without disassembling the pole or removing the pole from its mounted position.

BRIEF SUMMARY OF THE INVENTION

Briefly stated, one aspect of a preferred embodiment of the present invention is directed to an adjustable pole caddy comprising an elongated pole, a shelf including a generally planar surface for supporting at least one object thereon, a clamp having a first aperture and a second aperture, and a fastener extending through the first aperture of the clamp. The second aperture extends around at least a portion of an outer periphery of the pole. In a locked position of the fastener and clamp, an end portion of the fastener engages the pole and at least a portion of the shelf removably engages at least a portion of the clamp. In the locked position, the clamp is secured to the pole and the shelf is secured to the clamp. In a released position of the fastener and clamp, the end portion of the fastener does not engage the pole.

In another aspect, a preferred embodiment of the present invention is directed to an adjustable pole caddy comprising an elongated pole, a shelf including a bracket and a generally planar surface for supporting at least one object thereon, a clamp having a first aperture defining a first passageway and a second aperture defining a second passageway, and a fastener extending through the first passageway of the clamp. The first passageway of the clamp extends generally perpendicular to a longitudinal axis of the pole and the second passageway of the clamp completely surrounds an outer periphery of the pole and extends generally parallel to the longitudinal axis of the pole. In a locked position of the fastener and clamp, an end portion of the fastener engages the pole and the bracket of the shelf removably engages at least a portion of the clamp. In the locked position, the clamp is secured to the pole and the shelf is secured to the clamp. In a released position of the fastener and clamp, the end portion of the fastener does not engage the pole and the clamp is movable with respect to the pole.

In another aspect, a preferred embodiment of the present invention is directed to a method of adjusting a shelf of a shower caddy. The method comprises (i) providing a shower caddy comprising an elongated pole and a shelf including a generally planar surface for supporting at least one object thereon; (ii) placing a clamp having a first aperture and a second aperture at a first position on the pole such that the second aperture of the clamp extends around at least a portion of an outer periphery of the pole; (iii) inserting a fastener through the first aperture of the clamp until an end portion of the fastener engages at least a portion of the pole to secure the clamp to the pole; and (iv) positioning the shelf on the clamp such that at least a portion of the shelf removably engages at least a portion of the clamp to removably secure the shelf to the clamp.

BRIEF DESCRIPTION OF THE SEVERAL VIEWS OF THE DRAWINGS

The foregoing summary, as well as the following detailed description of preferred embodiments of the present invention, will be better understood when read in conjunction with the appended drawings. For the purpose of illustrating the present invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
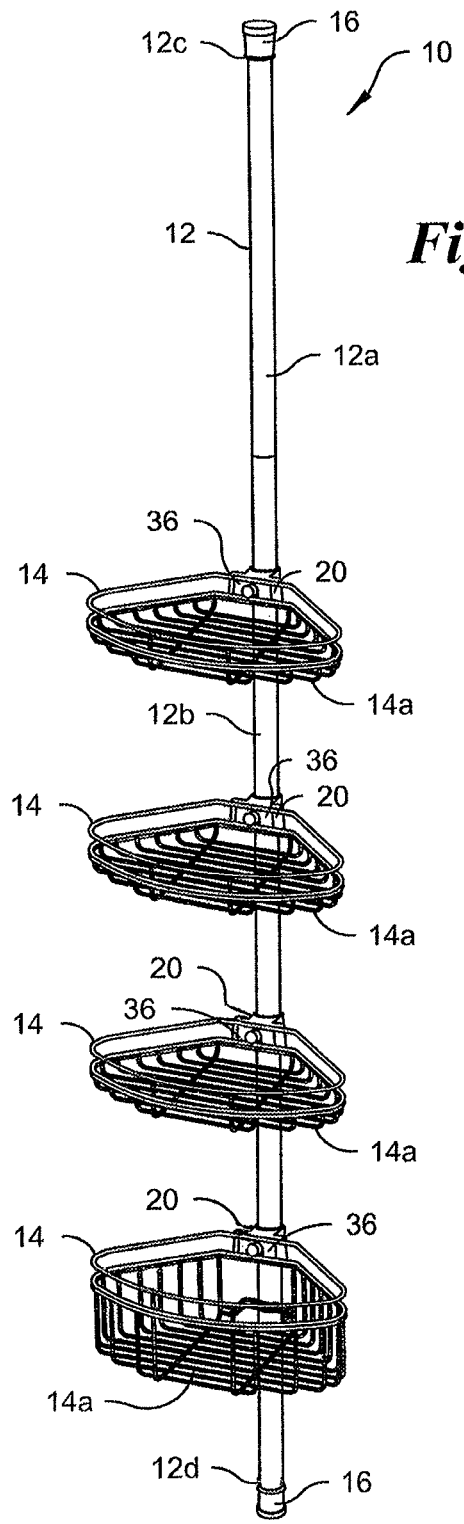
FIG. 1 is front perspective view of an adjustable pole shower caddy in accordance with a preferred embodiment of the present invention.
Figure 2:
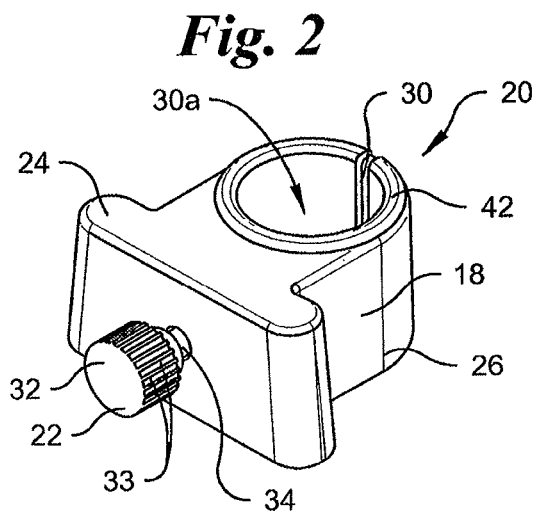
FIG. 2 is an enlarged front perspective view of a clamping mechanism in accordance with a preferred embodiment of the present invention.

Certain terminology is used in the following description for convenience only and is not limiting. The words "right,"

"left," "top," "bottom" and "lower" designate directions in the drawings to which reference is made. The words "first," "second," "third" and "fourth" designate an order of operations in the drawings to which reference is made, but do not limit these steps to the exact order described. The words "inwardly" and "outwardly" refer to directions toward and away from, respectively, the geometric center of the device and designated parts thereof. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals and characters indicate like elements throughout, there is shown in FIGS. 1-7 presently preferred embodiments of an adjustable shelf assembly in accordance with the present invention. With reference initially to FIG. 1, the adjustable shelf assembly preferably functions as an adjustable pole shower caddy, generally designated 10.

With particular reference to FIGS. 1-3B, the shower caddy 10 comprises an elongated support rail or pole 12 and at least one shelf 14 for supporting bathroom supplies (none shown), such as soap and shampoo. More preferably, the caddy 10 comprises a plurality of shelves 14.

The pole 12 is preferably formed of a high-strength, light weight material, such as a metallic or polymeric material. It will be understood that other suitable materials may be used for formation of the pole 12.

In one embodiment, the pole 12 is an adjustable rod including a first pole section 12a, a second pole section 12b, and first and second end caps 16. The first and second end caps 16 are positioned over each of the respective distal ends 12c, 12d of the first and second pole sections 12a, 12b. Each of the first and second pole sections 12a, 12b is preferably in the form a hollow tubular section. The second pole section 12b has an inner diameter that is slightly larger than the outer diameter of the first pole section 12a, such that the first pole section 12a is telescopically received within an interior of the second pole section 12b. Accordingly, the length of the pole 12 is adjusted by rotating one of the first or second pole sections 12a, 12b relative to the other to move the pole sections 12a, 12b to either elongate or decrease the overall length of the pole 12.

It will be appreciated that the pole 12 may include additional pole sections. It will also be understood by those skilled in the art that the pole 12 need not be adjustable and need not comprise separate pole sections. Instead, the pole 12 may be formed of a single integral tubular member which is or is not adjustable.

The pole 12 is preferably mounted in a corner of a bathtub or shower (none shown), but can be mounted at any location of a shower stall or bathtub enclosure. The pole 12 is preferably vertically oriented and mounted between opposing and horizontally oriented surfaces of a shower stall or bathtub enclosure, such as between a ceiling (not shown) and a floor or tub ledge (not shown) of the shower stall or bathtub enclosure. Preferably, in the mounted position of the pole 12, the end caps 16 are in contact with the opposing surfaces of the shower stall or bathtub enclosure and the pole 12 is configured to apply compressive forces to the opposing surfaces to maintain the pole 12 in place in the mounted position. It will be understood by those skilled in the art that the pole 12 need not be mounted to and maintained between the opposing surfaces by compressive forces. Instead, the pole 12 may be otherwise mounted to the opposing surfaces, such as fixedly or removably mounted thereto using fasteners, screws, adhesives, suction cups and the like.

The shelves 14 of the caddy 10 may have any desired shape, such as rectangular, square, ovular, trapezoidal, and the like. The shelves 14 of the caddy 10 may also have any desired dimensions, as long as each shelf 14 is large enough to accommodate at least one bathing item, such as soap, shampoo and the like. Each shelf 14 preferably includes at least one generally planar support surface 14a for supporting at least one object thereon. Each shelf 14 is preferably formed of a high-strength, light weight material, such as a metallic or polymeric material.

Figure 4:
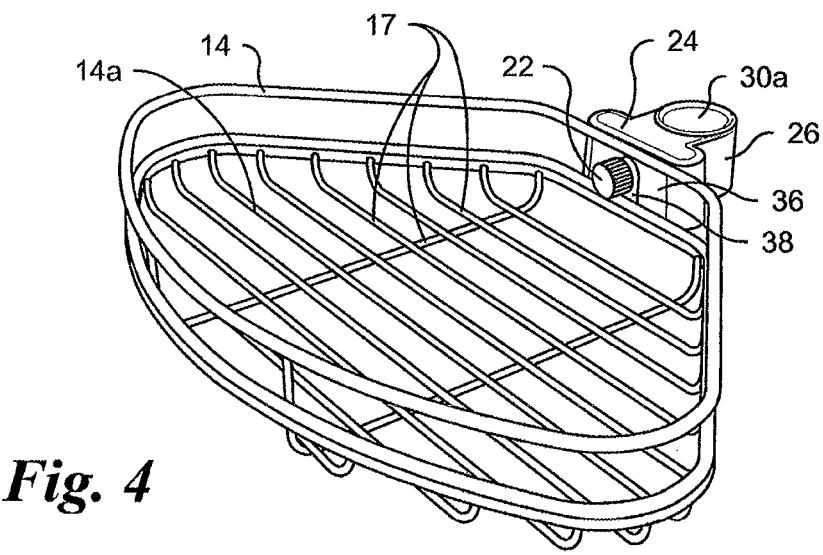
FIG. 4 is a front perspective view of a shelf and clamping mechanism in an attached position in accordance with a preferred embodiment of the present invention.
Figure 5:
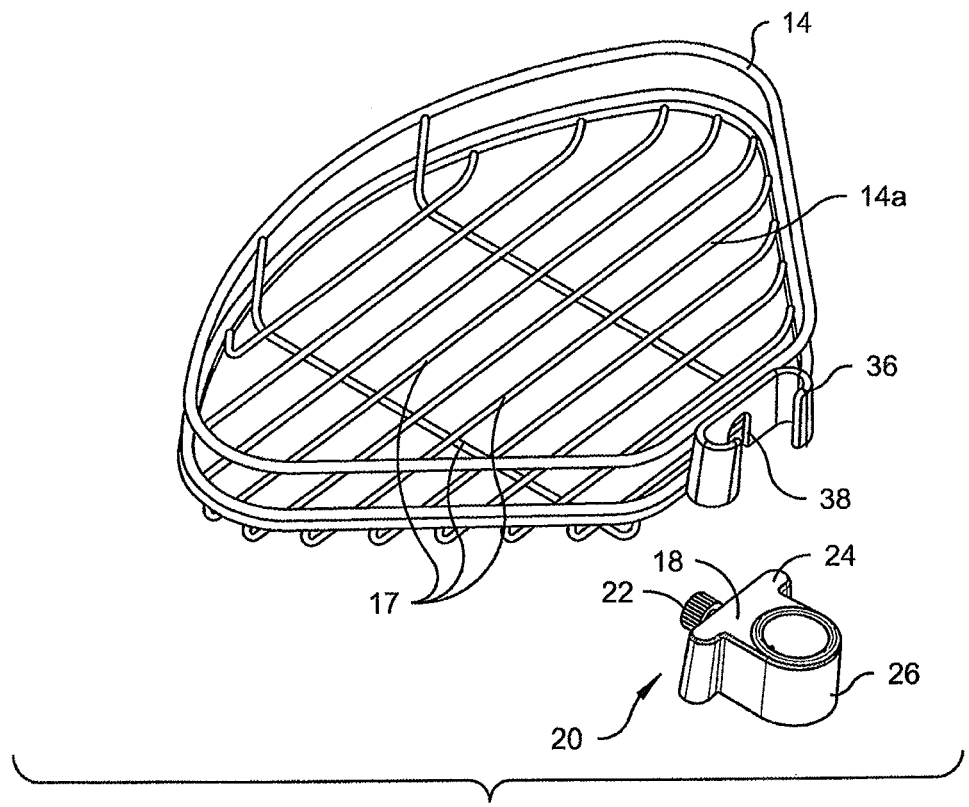
FIG. 5 is a rear perspective view of a shelf and clamping mechanism in a detached position in accordance with a preferred embodiment of the present invention.

In one embodiment, the shelves 14 are formed as wire shelves 14, preferably metal wire shelves 14, as shown in FIGS. 4-5. Referring to FIGS. 4-5, the planar support surface 14a of each of the wire shelves 14 is formed by a plurality of transversely extending and spaced-apart horizontal wires 17. Because there are spaces between the plurality of wires 17 forming the planar support surface 14a, each shelf 14 forms and functions as a drainage member.

Figure 6:
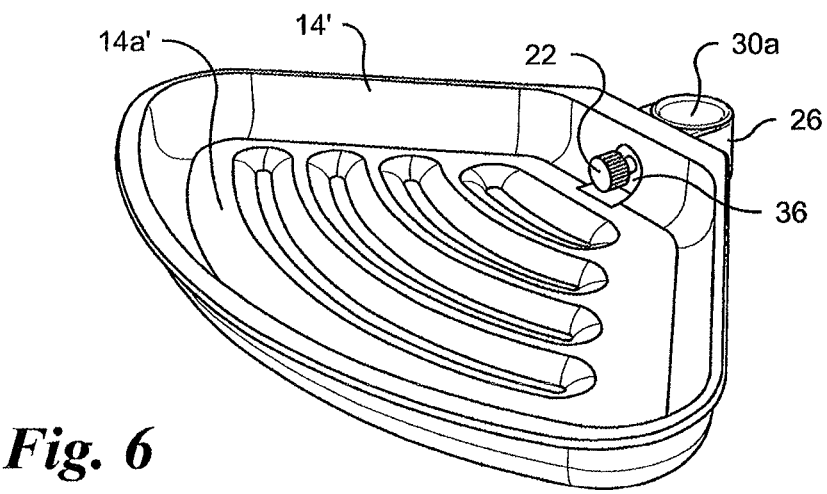
FIG. 6 is a front perspective view of a shelf and clamping mechanism in an attached position in accordance with another preferred embodiment of the present invention.
Figure 7:
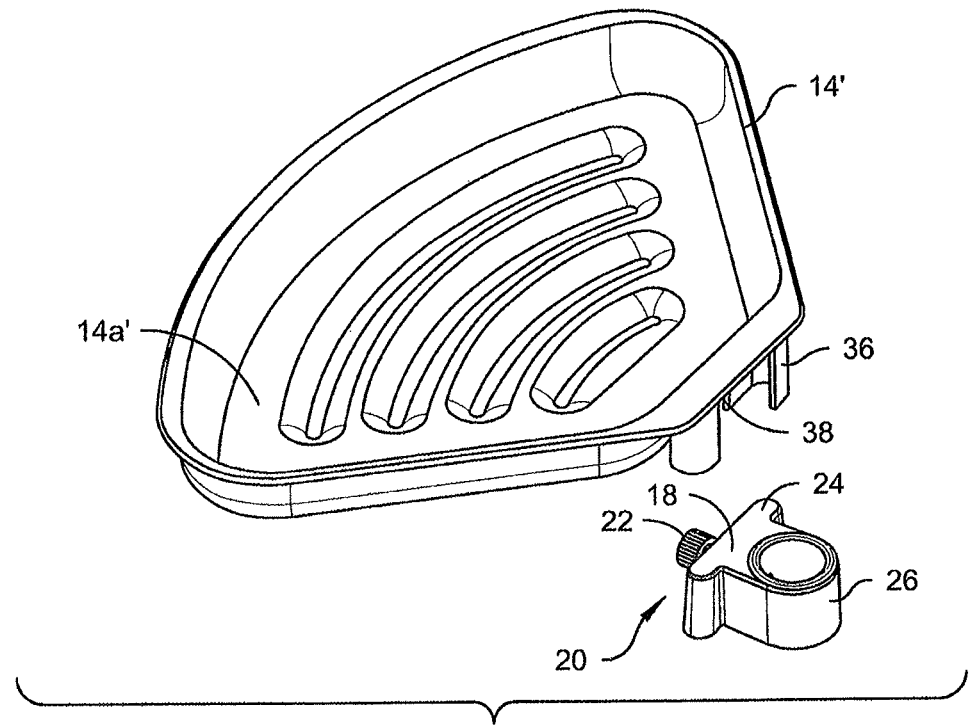
FIG. 7 is a rear perspective view of a shelf and clamping mechanism in a detached position in accordance with another preferred embodiment of the present invention.

In another embodiment, as shown in FIGS. 6-7, the body of each shelf 14' is formed from a plastic or polymeric material. The planar support surface 14a' of each plastic or polymeric shelf 14' is formed by an integral and solid piece of plastic or polymeric material. The planar support surface 14a' may further include one or more slots, holes or openings formed therein to serve as drainage members.

It will be appreciated that some suitable material, other than metal, plastic or a polymeric material, may alternatively be used to form each shelf 14, 14'. For example, each shelf 14, 14' may be formed of a metal coated with a polymeric material or some other combination of these materials. Further, as shown in FIG. 1, the plurality of shelves 14 of a single caddy 10 need not be uniform in size, shape, dimensions and materials of construction. Instead, the caddy 10 may include a plurality of shelves 14, some or each of which have differing appearances, sizes, shapes, dimensions, materials, and the like.

The caddy 10 preferably also includes at least one clamping mechanism 20. More preferably, the caddy 10 includes a plurality of clamping mechanisms 20. Preferably, one clamping mechanism 20 is provided for each shelf 14, 14' of the caddy 10. More preferably, at least a portion of each shelf 14, 14' of the caddy 10 is preferably removably attachable to and engageable with a clamping mechanism 20. Each clamping mechanism 20 includes a clamp 18 and a fastener 22. Each clamp 18 is movably and, more particularly, slidingly mounted to the pole 12. Each clamp 18 is preferably formed a high-strength, light weight material, such as a metallic or polymeric material. More preferably, each clamp 18 is formed of a metal material. However, it will be appreciated that any suitable material may be used to form the clamp 18.

The clamp 18 has an elongated body 24 and a projection 26 which extends perpendicularly away from the elongated body 24. Preferably, the projection 26 has a generally U-shaped cross-sectional shape (see FIG. 3B). However, it will be appreciated that the projection 26 may have any other suitable shape, such as a C-shaped cross section, a rectangular cross-section and the like. A first generally cylindrical aperture 28 is formed through the elongated body 24 of the clamp 18 and defines a first passageway 28a that extends generally perpendicular to a longitudinal axis of the pole 12. A second generally cylindrical aperture 30 is formed through the projection 26 of the clamp 18 and defines a second passageway 30a that extends generally parallel to the longitudinal axis of the pole 12. The first passageway 28a extends generally perpendicular to the second passageway 30a. The first passageway 28a also preferably transversely extends throughout the entire width of the elongated body 24, such that the first passageway 28a is open to and in fluid communication with the second passageway 30a. It will be appreciated that the second aperture 30 and the second passageway 30a need not be cylindrical in shape. Instead, the second aperture 30 and the second passageway 30a may be of any other suitable shape, such as U-shaped or semi-circular in cross-section.

Preferably, the second passageway 30a is provided with a protective sleeve 42 which covers at least a portion of the interior periphery of the second passageway 30a. More preferably, the protective sleeve 42 covers the entire interior periphery of the second passageway 30a. The protective sleeve 42 preferably also includes an aperture 42a at the location where the first passageway 28a meets the second passageway 30a. The protective sleeve 42 is preferably selectively attachable to and removable from the clamp 18. The protective sleeve 42 may be formed of any material that is capable of providing a barrier, and preferably a cushioned barrier, between the clamp 18, and more particularly the second passageway 30a of the clamp 18, and the pole 12. For example, the protective sleeve 42 may be formed of rubber, plastic, or any elastic polymer.

Each clamp 18 is attached to the pole 12 by inserting the pole 12 within the second passageway 30a of the clamp 18. The second passageway 30a and the protective sleeve 42 each has an inner diameter that is slightly larger than the outer diameter of the pole 12, such that each clamp 18 and the pole 12 are movable and slidable relative to each other. Alternatively, the protective sleeve 42 may have an inner diameter that is the same as or slightly smaller than the outer diameter of the pole 12 in order to provide an interference or tight fit. Preferably, the second aperture 30, the second passageway 30a and the protective sleeve 42 extend around at least a portion of an outer periphery of the pole 12. More preferably, the second aperture 30 and the second passageway 30a extend around the entire outer periphery of the pole 12.

The fasteners 22 of each of the clamping mechanisms 20 serve to secure each clamp 18 to the pole 12. Each fastener 22 is preferably formed of a metal material. However, it will be appreciated that any suitable material, such as a high-strength, light weight polymeric material, may be used to form the fasteners 22. Each fastener 22 preferably includes a fastening body 34 and a head 32 attached to a first end 34a of the fastening body 34. The head 32 is formed as a handle 32. At least a portion of the outer periphery of the handle 32 is provided with a plurality of spaced-apart ribs 33 which facilitate gripping of the handle 32 by a user. More preferably, the entire outer periphery of the handle 32 is provided with the plurality of spaced-apart ribs 33. The fastening body 34 of each fastener 22 is sized and shaped to be removably received within the first passageway 28a of each clamp 18. It will be appreciated that the fastener 22 may take any appropriate form, such as a bolt, screw, peg, dowel, bolt, nail, and the like.

In one embodiment, each fastener 22 is preferably in the form of a screw, such that at least a portion of the outer periphery of the fastening body 34 is preferably provided with a thread pattern (not shown). Preferably, at least a portion of, and more preferably the entire, internal periphery of the first passageway 28a of each clamp 18 is provided with a thread pattern (not shown) that complements that of the fastening body 34.

Each of the plurality of shelves 14, 14' is configured to be removably attached to one of the clamping mechanisms 20. As such, each of the plurality of shelves 14, 14' becomes movably and removably mounted to the pole 12 by a clamping mechanism 20. More particularly, each of the plurality of shelves 14, 14' becomes slidingly and removably mounted to the pole 12 by a clamping mechanism 20.

In one preferred embodiment, each shelf 14, 14' includes a securing bracket 36 for removably engaging at least a portion of a clamping mechanism 20. Each securing bracket 36 is preferably fixedly attached to or integrally formed with a portion of each shelf 14, 14'. However, it will be appreciated that the securing bracket 36 may be removably attached to each shelf 14, 14'. It will also be appreciated that the securing bracket 36 may be positioned on any portion of the shelf 14, 14'. Each shelf 14, 14' may also be provided with more than one securing bracket 36.

As shown in FIGS. 4-7, each securing bracket 36 has a C-shaped cross-section and is sized and shaped to at least partially surround and removably engage the elongated body 24 of the clamp 18. It will be appreciated that the securing bracket 36 may have any other suitable shape, as long as the size and shape of the securing bracket 36 corresponds to that of the elongated body 24 of the clamp 18. Each securing bracket 36 also includes a groove or archway 38 formed in the body of the bracket 36. Preferably, the groove 38 has a U-shaped cross-sectional shape and is sized and shaped to removably receive at least a portion of the fastener 22. It will be appreciated that the clamp 18 may be removably attached to each shelf 14, 14' by any suitable fastening mechanism, other than a bracket. For example, the clamp 18 may be removably attached to each shelf 14, 14' by adhesives, ties, straps, bands, fasteners and the like.

Figure 3:
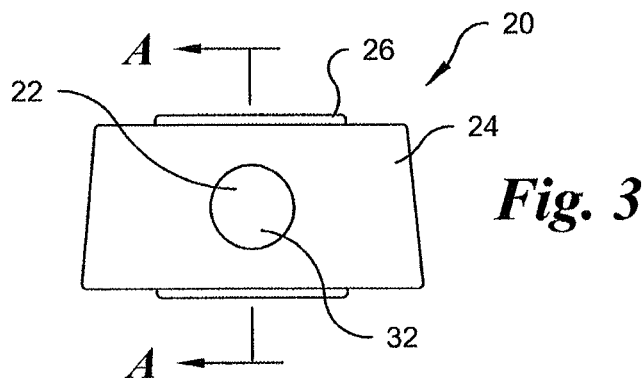
FIG. 3 is a front elevational view of the clamping mechanism of FIG. 2.
Figure 3A:
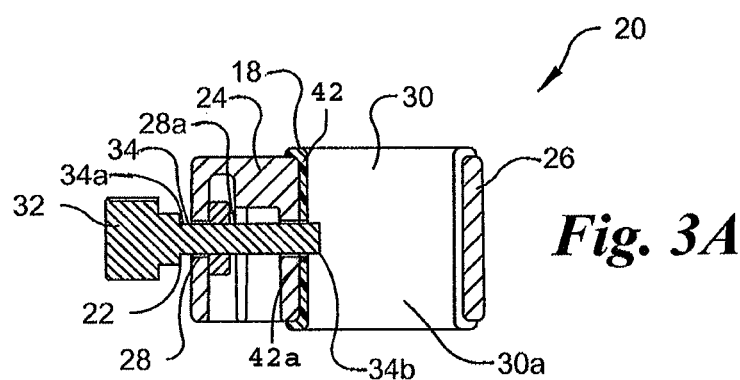
FIG. 3A is a right side cross-sectional view of the clamp and fastener assembly of FIG. 3.

To place each clamping mechanism 20 in a locked position, the clamp 18 is positioned on the pole 12 at the desired location of a shelf 14, 14'. The fastener 22 is then inserted through the first passageway 28a of the clamp 18. Where the fastener 22 is in the form of a screw, the user then grasps the handle 32 and rotates the fastener 22 in a first direction which causes the threads of the fastening body 34 to engage with the threads of the first passageway 28a and to thereby move the fastener 22 toward the second passageway 30a. This engagement causes the fastener 22 to begin to become tightened and to place the clamp 18 in a generally locked position. More particularly, the engagement of the threaded fastening body 34 and the threaded first passageway 28a causes the fastening body 34 to pass through the first passageway 28a of the elongated body 24 of the clamp 18 toward the second passageway 30a of the projection 26 of the clamp 18. The fastener 22 is rotated and tightened until a second end 34b of the fastening body 34 protrudes at least slightly into the second passageway 30a and directly engages a portion of the pole 12 positioned within the second passageway 30a (see FIGS. 3A-3B). Preferably, the second end 34b of the fastening body 34 directly engages a portion of the pole 12 in a friction fit. The friction fit of the fastener 22 against the pole 12 ensures that the clamp 18 is in a locked and securely mounted position on the pole 12.

Figure 3B:
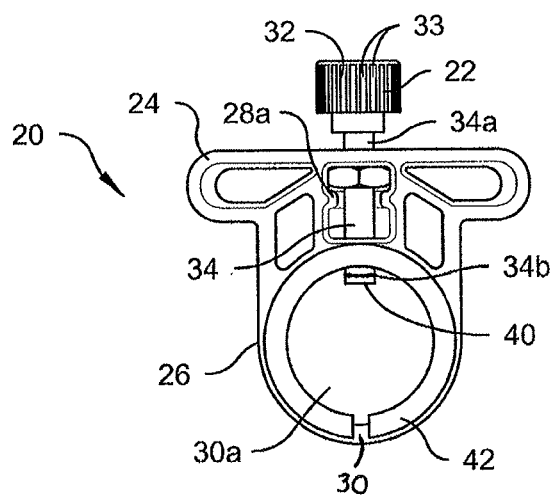
FIG. 3B is a bottom plan view of the clamping mechanism of FIG. 3.

Referring to FIG. 3B, in one embodiment, the second end 34b of the fastening body 34 includes a generally elastic or resilient tip portion 40 that provides increased friction when the fastener 22 engages the pole 12 in the generally locked position. The tip portion 40 may be formed of any material that is capable of achieving a friction fit between the fastener 22 and the pole 12, such as rubber or another an elastic polymer or latex.

To place the caddy 10 in an assembled position, a shelf 14, 14' is removably attached to the clamping mechanism 20 (see FIGS. 1, 4 and 6). This is done by positioning the shelf 14, 14' and the attached securing bracket 36 over the fastener 22 and the elongated body 24 of the clamp 18 until the elongated body 24 is received with the securing bracket 36 and at least a portion of the fastener 22 is received within the groove 38 of the securing bracket 36. More particularly, in the assembled and attached position, a portion of the fastener 22 engages an upper closed end of the groove 38 of the securing bracket 36 (see FIGS. 4 and 6).

To detach or remove the shelf 14, 14' from the caddy 10, the user need only lift the shelf 14, 14' out of engagement with the fastener 22 and the clamp 18 (see FIGS. 5 and 7). Also, the positioning of each shelf 14, 14' on the pole 12 is easily modifiable. First, either with or without the shelf 14, 14' being engaged with the fastener 22 and the clamp 18, the clamping mechanism 20 must be placed into a partially or fully released position. To do so, the handle 32 of the fastener 22 is utilized to rotate the fastener 22 in a second direction, opposite to the first direction, which causes loosening of the fastener 22. More particularly, rotating the fastener 22 in the second direction causes the fastening body 34 to move through the first passageway 28a away from the second passageway 30a. The fastener 22 is rotated in the second direction until the second end 34b of the fastening body 34 is brought out of engagement with the pole 12. The clamping mechanism 20 is thus placed in a released position in which the clamp 18 is freely slidable over the entire length of the pole 12 and, conversely, the pole 12 is freely slidable through the second passageway 30a of the clamp 18. Then, the clamp 18 is moved or slid either in an upward or downward direction along the longitudinal axis of the pole 12 until the clamp 18 is located at the newly desired position of the shelf 14, 14'. Finally, the fastener 22 is re-tightened and the clamp 18 is placed in the locked position by grasping the handle 32 and rotating the fastener 22 in the first direction which causes the threaded fastening body 34 to engage with and pass through the threaded first passageway 28a of the clamp 18 until the second end 34a of the fastening body 34 engages and is friction fit against a portion of the pole 12. Finally, if the aforementioned steps were performed with the shelf 14, 14' removed, the shelf 14, 14' and the attached securing bracket 36 are positioned over the fastener 22 and the elongated body 24 of the clamp 18 until the elongated body 24 is received with the securing bracket 36 and at least a portion of the fastener 22 is received within the groove 38 of the securing bracket 36.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of adjusting a shelf of a shower caddy, the method comprising:
   (i) providing a shower caddy comprising:
      an elongated pole,
      a shelf including a generally planar surface for supporting at least one object thereon,
      a clamp having an elongated body and a projection extending perpendicularly away from the elongated body, the elongated body including a first aperture and the projection including a second aperture, wherein the clamp is generally T-shaped in a cross-section perpendicular to an axis of the second aperture, such that the elongated body corresponds to a cross-member of the T-shape and the projection corresponds to a leg of the T-shape, and
      a bracket secured to an exterior of the shelf and shaped to removably mate with the elongated body of the clamp, the bracket including a groove extending upwardly from a base end thereof;
   (ii) placing the clamp at a first position on the pole such that the second aperture of the clamp extends around at least a portion of an outer periphery of the pole;
   (iii) inserting a fastener through the first aperture of the elongated body of the clamp until an end portion of the fastener engages at least a portion of the pole to secure the clamp to the pole; and
   (iv) positioning the shelf on the clamp and removably engaging the bracket with at least a portion of the elongated body and the groove with at least a portion of the fastener, such that the fastener projects through the groove and a head portion of the fastener projects atop a portion of the generally planar surface of the shelf to removably secure the shelf to the clamp.

2. The method of adjusting a shelf of a shower caddy according to claim 1, the method further comprising:
   (v) moving the shelf out of engagement with the clamp;
   (vi) moving the fastener through the first aperture until the fastener does not engage the pole;
   (vii) sliding the clamp to a second position on the pole;
   (viii) moving the fastener through the first aperture of the clamp until the end portion of the fastener directly engages at least a portion of the pole to secure the clamp to the pole; and
   (ix) re-positioning the shelf on the clamp to removably secure the shelf to the clamp.

* * * * *